United States Patent [19]

Kinack et al.

[11] Patent Number: 4,809,816

[45] Date of Patent: Mar. 7, 1989

[54] METAL FLAKE GREASE GUN

[76] Inventors: Vincent S. Kinack, 15 Lakeview Ter., Oakland, N.J. 07436; George Spector, 233 Broadway Rm 3615, New York, N.Y. 10007

[21] Appl. No.: 892,492

[22] Filed: Aug. 4, 1986

[51] Int. Cl.⁴ .............................................. F01M 11/04
[52] U.S. Cl. .................................... 184/105.2; 222/493; 239/319; 239/569; 251/346; 251/350; 251/351; 251/354
[58] Field of Search .......................... 184/105.2, 105.1; 222/387, 493; 239/319, 569, 570, 458, 581.2; 251/155, 350, 351, 353, 354, 346; 252/12, 19, 26

[56] References Cited

U.S. PATENT DOCUMENTS

| | | | |
|---|---|---|---|
| 730,065 | 6/1903 | Wilson | 184/105.2 |
| 988,422 | 4/1911 | Wilson | 222/387 |
| 1,401,765 | 12/1921 | Davis | 184/105.2 |
| 1,609,424 | 12/1926 | Paul | 222/387 |
| 1,789,536 | 1/1931 | Seghers | 222/387 |
| 2,013,273 | 9/1935 | Jonsson | 184/105.2 |
| 2,525,640 | 10/1950 | Borg | 239/458 |
| 2,700,623 | 1/1955 | Hall | 252/26 |
| 2,729,369 | 1/1956 | Chinchole | 222/493 |
| 2,758,758 | 8/1956 | Schimpt | 222/387 |
| 3,232,872 | 2/1966 | Kohn | 252/18 |
| 3,242,076 | 3/1966 | Hagan | 252/26 |
| 3,423,315 | 1/1969 | McCarthy | 252/19 |
| 3,674,214 | 7/1972 | Brown | 239/569 |
| 3,751,363 | 8/1973 | Rhode | 252/19 |
| 3,945,533 | 3/1976 | Otto | 239/569 |
| 4,358,384 | 11/1982 | Newcomb | 252/19 |
| 4,379,062 | 4/1983 | Prengamon | 252/26 |
| 4,469,609 | 9/1984 | Bandish | 252/26 |

FOREIGN PATENT DOCUMENTS

| | | | |
|---|---|---|---|
| 140423 | 3/1951 | Australia | 251/354 |
| 192529 | 11/1921 | Canada | 251/346 |
| 585931 | 10/1933 | Fed. Rep. of Germany | 251/354 |

Primary Examiner—Carlton R. Croyle
Assistant Examiner—Eugene L. Szczecina, Jr.

[57] ABSTRACT

A metal flake grease having malleable metal flakes and an injector gun comprising an adjustable nozzle specially designed to allow metal flake grease to a grease fitting joint and into a worn area between inner and outer portions of the joint to become bonded thereto and form a new lining therein for extending life of the joint.

2 Claims, 1 Drawing Sheet

METAL FLAKE GREASE GUN

BACKGROUND OF THE INVENTION

The instant invention relates generally to lubricants having metal flakes of appropriate composition dispersed in the grease and a specially designed grease gun to dispense the metal flake grease.

Lubricants have been provided in prior art that are adapted to lubricate metalic parts which are generally in cosntant motion one against the other. For example, U.S. Pat. No. 3,232,872; 3,423,315; 3,751,363; 4,358,384; and 4,469,609 all are illustrative of such prior art. While these units may be suitable for the particular purpose to which they address, they do not provide a metal flake grease in combination with a dispensing gun which is effective in conveniently injecting the appropriate metal flake grease into a bearing or joint for repair and lubrication purpose.

SUMMARY OF THE INVENTION

A primary object of the present invention is to provide a metal flake grease that effectively is injected into a bearing or joint for repair and lubrication thereof.

Another object is to provide a metal flake grease gun from which the metal flake grease is effectively injected into a worn area of a grease fitting joint to lubricate and form a new lining thereinto extend the life of the joint.

An additional object is to provide a metal flake grease and gun injector that can be used in emergency situations, such as out in the field when there is not enough time to repair the machinery part or the machinery part cannot be obtained for replacement.

A further object is to provide a metal flake grease and injector gun that is simple and easy to use.

A still further object is to provide a metal flake grease and injector gun that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described with the scope of the appended Claims.

BRIEF DESCRIPTION OF THE DRAWING FIGURES

DETAILED DESCRIPTION OF THE PREFERRED EMBODIMENTS

Figure 1:
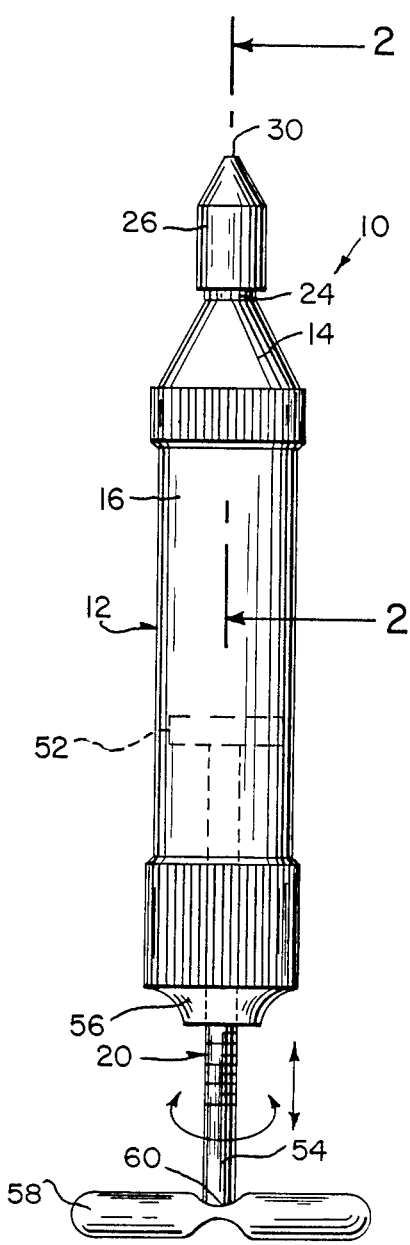
FIG. 1 is an elevational view of the Invention being a grease gun having an adjustable nozzle thereon.
Figure 2:
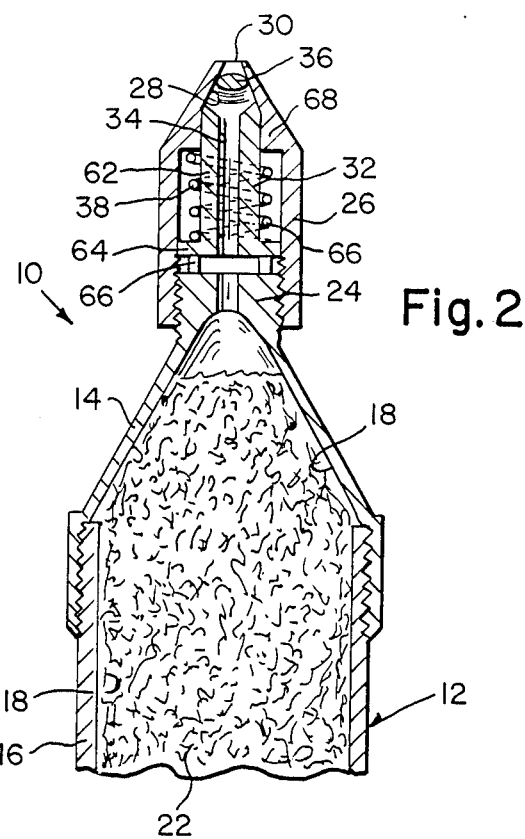
FIG. 2 is an enlarged cross sectional view taken along line 2—2 in FIG. 1 showing the internal structure and metal flake grease therein.

Turning now descriptively to the drawings, in which similar reference characters denote similar elements throughout the several views, FIGS. 1 and 2 illustrate a metal flake grease gun 10 which is specially designed to inject a grease having metal flakes dispensed therein. The gun has a casing 12 that has a tapered barrel section 14 and a housing section 16 so connected that in use, the housing section 16 depends from rear end of the tapered barrel section 14. The two sections have a continuous passage 18 therethrough. A mechanism 20 is for permitting even flow of metal flake grease 22 from the housing section 16 out through front portion 24 of the tapered barrel section 14.

A nozzle 26 designed to effectively permit passage of flake grease has a valve seat 28 near front end 30. The nozzle is adjustably connected to the front portion 24 of the tapered barrel section 14. A valve seat member 32 is mounted in the nozzle 26 and has a chamber 34 extending through a front tip 36 which is designed for reception in the valve seat 28 to seal the nozzle 26 against discharge of the metal flake grease 22 when the nozzle 26 is tightened onto the front portion 24 of the tapered barrel 14.

Figure 3:
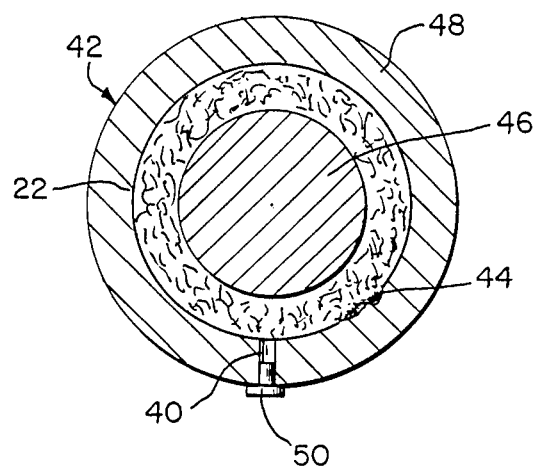
FIG. 3 is a cross sectional view of one typical grease fitting joint with the metal flake grease inside showing how the metal flakes became bonded to worn areas of the joint.

A resilient member 38 is provided for urging the valve seat member 32 inwardly from engagement with the valve 28 when the nozzle 26 is adjusted outwardly from said front portion 24 of the tapered barrel 14. This allows the metal flake grease 22 to flow easily through the chamber 34 of the valve seat member 32 and out of the nozzle 26. As shown in FIG. 3 the metal flake grease 22 is injected into a filler hole 40 of a typical grease fitting joint 42 and into worn area 44 between inner and outer portions 46, 48 of the joint 42 to form a new lining therein for extending life of the joint. A sealing cap 50 is then inserted within the filler hole 40. The flakes may be formed of a malleable metal which becomes communicated and bonded to the worn areas of the joint surfaces thus effecting repair thereof.

The flow permitting mechanism 20 includes a piston 52 slideably mounted in the housing section 16 of the casing 12. A shaft 54 depends from the piston 52 which extends out through bottom end 56 of the housing section 16. A hand grip 58 is mounted transversely to a distal end 60 of the shaft 54 so that the shaft can be pushed inwardly into the housing section 16 to operate the piston 52 allowing the metal flake grease 22 to exit the front end 30 of the nozzle 26.

The valve seat member 32 further includes an elongated cylindrical stem 62 centered within the nozzle 26. The stem 62 has an enlarged flange 64 with a plurality of stabilizing feet 66 at rear end thereof. The resilient member 38 is an expansion coil spring 66 mounted over the stem 62 within the nozzle 26 between an inwardly projecting portion 68 of the nozzle and the flange 64 of the stem 62 so that the stabilizing feet 66 will always sit upon the front portion 24 of the tapered barrel section 14.

It should be noted that the grease can be any type of grease used for joint or bearing lubrication and the metal flakes; different grades of metal having malleable properties whereby joint useage causes bonding of the metal to the joint surfaces effecting repairing pitted and otherwise worn areas providing a better fit. The grease fittings are preferably one way.

While certain novel features of this invention have been shown and described and are pointed out in the annexed claims, it will be understood that various omissions, substitutions and changes in the forms and details of the device illustrated and and in its operation can be made by those skilled in the art without departing from the spirit of the invention.

What is claimed:

1. A metal flake grease gun which comprises:

(a) a casing with a lubricant chamber and a front portion with a bore communicating with said lubricant chamber;
(b) a nozzle having a valve adjustably mounted on said front portion;
(c) a valve seat member mounted in said nozzle and having a channel extending to and around a front tip communicating with said bore, said valve adapted to engage said valve seat and said front tip sealing said nozzle against discharge of said metal flake grease when said nozzle is adjusted to a closed position; and
(d) means for biasing said valve seat member inwardly into disengagement with said valve when said nozzle is adjusted outwardly to an open position spaced from said seat member allowing lubricant to flow through said channel around said tip and out of said nozzle, wherein said valve seat member further includes an elongated cylindrical stem centered within said nozzle, said stem having an enlarged flange with a plurality of stabilizing feet at a rear end thereof.

2. A metal flake grease gun as recited in claim 1, wherein said resilient means includes an expansion coil spring mounted over said stem within said nozzle between an inwardly projecting portion of said nozzle and said flange of said stem so that said stabilizing feet will always sit upon said front portion of said tapered barrel section.

* * * * *